Patented Dec. 17, 1935

2,024,237

UNITED STATES PATENT OFFICE 2,024,237

METHOD OF CEMENTING CHANNEL FLAPS

Alexander D. Macdonald, Malden, Mass., assignor to Boston Blacking & Chemical Co., Boston, Mass., a corporation of Massachusetts No Drawing. Application November 30, 1934, Serial No. 755,370

5 Claims. (Cl. 12—142)

This invention relates to shoe manufacture, and more particularly to the laying or cementing of channel flaps on outsoles after an outsole has been secured by stitching to a welt or other portion of a shoe upper.

In the manufacture of welted and through-and-through stitched shoes it is common practice to cut a peripheral channel in the outsole and to stitch the outsole to the welt or to the shoe bottom with the stitches lying in the channel. Subsequently, the channel flap is cemented down. There is thus formed a shoe wherein the sole-attaching stitching is not visible on the bottom of the outsole. A common difficulty has been to cement the channel flap sufficiently securely to the base of the channel to prevent the channel flap from loosening prematurely with a consequent ragged appearance of the sole.

An object of this invention is to provide an improved method of laying or adhesively securing channel flaps such that a relatively permanent adhesion may be obtained.

Other objects of the invention will be apparent to those skilled in the art to which this invention appertains from the accompanying disclosure and claims.

In the accomplishment of the above and other objects, I have provided a method wherein an aqueous dispersion containing in the dispersed phase rubber and an organic solvent for rubber is applied to the cooperating surfaces of the channel flap and channel base, and the composition permitted to dry, preferably to a substantially transparent film. An anti-oxidant for rubber is peferably dissolved in the rubber solvent. The dry adhesive material is then activated, the channel flap and channel base brought into juxtaposition, and the assemblage placed under pressure.

The aqueous dispersion may be rubber latex, to which has been added an aqeuous emulsion of rubber solvents, preferably toluene and tri-chlor-ethylene. Phenyl-beta-naphthylamine is a preferred anti-oxidant, and desirably is dissolved in said toluene and tri-chlor-ethylene. The activation of the dried rubber is preferably accomplished by a dilute solution of rubber in an organic solvent, which solution may also contain additional anti-oxidant, for example, phenyl-beta-naphthylamine.

In carrying out this invention in a preferred manner, the cooperating surfaces of the channel flap and channel base of a leather outsole are preferably roughed in a suitable manner, such as by an emery paper wheel, or the channeling may be done in the first place in such a manner as to provide surfaces suitable for cementing. There is then applied to the cooperating surfaces of the channel flap and the channel base an adhesive composition of the following nature:

| | |
|---|---|
| Latex (60% rubber by weight) | 2.82 gals. |
| Phenyl-beta-naphthylamine | .11 lbs. |
| Toluene | .01 gal. |
| Tri-chlor-ethylene | .05 gals. |
| Nekal | .01 lbs. |
| Water | 2.11 gals. |

Yield: approximately 5 gallons.

The above composition, which has a rubber content of about 30% by weight, may be prepared by dissolving the phenyl-beta-naphthylamine in a mixture of the toluene and tri-chlor-ethylene. This solution may then be emulsified in a solution of the Nekal in water. The resulting emulsion may then be mixed with the latex.

In the above composition the latex serves as a source of rubber, the adhesive material of the composition. The phenyl-beta-naphthylamine is an anti-oxidant and increases the aging properties of the rubber. The toluene and tri-chrol-ethylene are rubber solvents and also solvents for the anti-oxidant. Toluene is readily emulsified and aids in the emulsification of other solvents associated therewith. The tri-chlor-ethylene associates readily with the rubber particles and assists in associating the dissolved anti-oxidant with the rubber. The Nekal is an emulsifying agent which assists in dispersing the rubber solvents in water.

After the above adhesive composition has become sufficiently dry so that the deposited film of rubber is transparent, an activating solution is applied to the surfaces of the rubber and permitted to stand for a short time, such as 10 or 15 seconds, whereupon the channel flap is laid over the channel base and the contiguous parts placed under attaching pressure for a suitable time, for example, about 1 minute.

The activating solution may have the following composition:

| | |
|---|---|
| Crepe rubber | 6.6 lbs. |
| Hot rolled crepe rubber | 5.3 lbs. |
| Benzol | 100.5 gals. |
| Phenyl-beta-naphthylamine | 0.1 lb. |

Yield: approximately 100 gallons.

In the above composition the hot rolled crepe rubber provides rubber in small particle size which when dissolved forms a solution of low viscosity. The crepe rubber associated therewith imparts strength to the rubber deposited from the solution. The benzol is the rubber solvent, and the phenyl-beta-naphthylamine is the anti-oxidant.

I have found that channels laid in the manner described herein do not loosen in the manner so characteristic of channel flaps laid in the ordinary manner with the usual rubber cements. By the use of the procedures and compositions disclosed herein an adhesive attachment of channel flap to channel base is produced of a quality hitherto unattained, and one which is particularly suited to withstand the conditions to which the channeled outsole of a shoe is subjected in actual wear.

Having described my invention, what I claim as new and desire to secure by Letters Patent of the United States is:

1. The method of laying the channel on a shoe sole which comprises applying to the cooperating surfaces of the channel flap and channel base an aqueous dispersion containing in the dispersed phase rubber and an organic solvent for rubber, permitting said composition to dry, activating with an organic solvent the material deposited upon the channel flap and channel base, bringing the channel flap and channel base into juxtaposition, and placing the assemblage under pressure.

2. The method of laying the channel on a leather shoe sole which comprises applying to the cooperating surfaces of the channel flap and channel base an aqueous dispersion containing in the dispersed phase rubber and an anti-oxidant, permitting said composition to dry to a substantially transparent film, activating said transparent film with an organic solvent, bringing the channel flap and the channel base into juxtaposition, and placing the assemblage under pressure.

3. The method of laying a channel on a leather shoe sole which comprises applying to the cooperating surfaces of the channel flap and channel base an aqueous dispersion containing in the dispersed phase rubber, phenyl-beta-naphthylamine, and an organic solvent for rubber, permitting said composition to dry to a substantially transparent film, applying to said film a solution of rubber in an organic solvent, thereby to activate said film, bringing the channel flap and channel base into juxtaposition, and placing the assemblage under pressure.

4. The method of laying a channel on a leather shoe sole which comprises applying to the cooperating surfaces of the channel flap and channel base rubber latex containing an aqueous emulsion of an anti-oxidant dissolved in an organic solvent for rubber, permitting said composition to dry to a substantially transparent film, subsequently activating said film, bringing the channel flap and channel base into juxtaposition, and placing the assemblage under pressure.

5. The method of laying a channel on a leather shoe sole which comprises applying to the cooperating surfaces of the channel flap and channel base rubber latex containing an aqueous emulsion of toluene and tri-chlor-ethylene, permitting said composition to dry to a substantially transparent film, activating said film with a dilute solution of rubber in an organic solvent, bringing said channel flap and channel base into juxtaposition, and placing the assemblage under pressure.

ALEXANDER D. MACDONALD.